United States Patent
Raju et al.

(10) Patent No.: US 8,223,729 B2
(45) Date of Patent: Jul. 17, 2012

(54) RADIO INTERFACE SELECTION FOR A TERMINAL

(75) Inventors: Lalit Yerramilli Raju, San Diego, CA (US); Amit Gil, San Diego, CA (US); Henri Bahini Dagbegnon, San Diego, CA (US); Anup Kuzhiyil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1096 days.

(21) Appl. No.: 11/737,566

(22) Filed: Apr. 19, 2007

(65) Prior Publication Data

US 2008/0019339 A1    Jan. 24, 2008

Related U.S. Application Data

(60) Provisional application No. 60/832,039, filed on Jul. 19, 2006.

(51) Int. Cl.
*H04W 4/00* (2009.01)

(52) U.S. Cl. ............... 370/338; 370/328; 455/552.1; 455/557

(58) Field of Classification Search ............ 370/338, 370/328; 455/552.1, 557
See application file for complete search history.

(56) References Cited

U.S. PATENT DOCUMENTS

| | | | |
|---|---|---|---|
| 7,065,367 B2 * | 6/2006 | Michaelis et al. | 455/452.2 |
| 7,164,912 B2 | 1/2007 | Buckley et al. | |
| 7,194,263 B2 * | 3/2007 | Bahl et al. | 455/432.1 |
| 7,599,323 B2 * | 10/2009 | Chandranmenon et al. | 370/328 |
| 2002/0177410 A1 * | 11/2002 | Klein et al. | 455/41 |
| 2009/0196234 A1 * | 8/2009 | Greene et al. | 370/328 |

FOREIGN PATENT DOCUMENTS

| | | |
|---|---|---|
| EP | 1589703 | 10/2005 |
| EP | 1613108 | 1/2006 |

(Continued)

OTHER PUBLICATIONS

International Search Report—PCT/US07/073707, International Search Authority—European Patent Office—Dec. 19, 2007.

(Continued)

*Primary Examiner* — Nghi Ly
(74) *Attorney, Agent, or Firm* — Kevin T. Cheatham (57) ABSTRACT

Techniques for selecting a radio interface for an application are described. A terminal identifies locally-addressable and globally-addressable wireless networks among wireless networks available to the terminal. Radio interfaces supported by the terminal may be prioritized based on the locally-addressable and globally-addressable wireless networks, information obtained for the application, the application type, etc. Different applications may have different radio interface preferences or requirements, which may be considered in prioritizing the radio interfaces. A suitable radio interface may be selected for the application based on the prioritized radio interfaces. WLAN interface may be selected for the application if (a) the WLAN interface is preferred and any WLAN is acceptable to the application or (b) a globally-addressable WLAN is available. A WLAN interface may be selected for the application if a globally-addressable WLAN is not available.

25 Claims, 5 Drawing Sheets

FOREIGN PATENT DOCUMENTS

| | | |
|---|---|---|
| JP | 2002112347 | 4/2002 |
| JP | 2003299150 A | 10/2003 |
| JP | 2004356815 A | 12/2004 |
| JP | 2006501777 A | 1/2006 |
| RU | 2277762 | 6/2006 |
| TW | 200419990 | 10/2004 |
| TW | 200607366 | 2/2006 |
| WO | 04008793 | 1/2004 |
| WO | WO2004032536 | 4/2004 |
| WO | WO2004077867 A2 | 9/2004 |

OTHER PUBLICATIONS

"Universal Mobile Telecommunications System (UTMS): Requirements on 3GPP System to Wireless Local Area Network (WLAN) interworking(3GPP TS 22.234 version 6.2.0 Release 6); ETSI 122 234"ETSl Standards, European Telecommunications Standards Institute Sophia-Antipo, FR, vol. 3-SA1, No. V620, Sep. 2004, XP014027434.

Written Opinion—PCT/US2007/073707, International Search Authority, European Patent Office, Dec. 19, 2007.

\* cited by examiner

RADIO INTERFACE SELECTION FOR A TERMINAL

The present application claims priority to provisional U.S. Application Ser. No. 60/832,039, entitled "Interface Selection in WLAN Adhoc Mode," filed Jul. 19, 2006, assigned to the assignee hereof and incorporated herein by reference.

BACKGROUND

I. Field

The present disclosure relates generally to communication, and more specifically to techniques for selecting wireless networks for communication.

II. Background

Wireless communication networks are widely deployed to support communication for terminals, which may be cellular phones, laptop computers, etc. These wireless networks include wireless wide area networks (WWANs), wireless local area networks (WLANs), and wireless personal area networks (WPANs). Different types of wireless networks have different coverage and different capabilities. In general, it is desirable to obtain communication or data connectively from a wireless network that is capable of providing the required communication or data connectivity and is also the most preferred (e.g., the most economical) among all available wireless networks.

SUMMARY

Techniques for selecting a radio interface for an application to achieve good performance are described herein. Radio interface is also commonly referred to as radio technology, bearer technology, air-link interface, etc.

In an aspect, a terminal identifies locally-addressable and globally-addressable wireless networks among wireless networks available to the terminal. A locally-addressable wireless network is a wireless network in which data is not sent outside of the wireless network. A globally-addressable wireless network is a wireless network in which data may be sent outside of the wireless network. Radio interfaces supported by the terminal may be prioritized based on the locally-addressable and globally-addressable wireless networks, information obtained for the application, the application type, etc. Different applications may have different radio interface preferences or requirements, which may be considered in prioritizing the radio interfaces. A suitable radio interface may be selected for the application based on the prioritized radio interfaces.

In one design, if a locally-addressable WLAN (e.g., an ad hoc network in IEEE 802.11) is available, then WLAN interface may be selected for the application based on information indicating that the WLAN interface is preferred and any WLAN is acceptable to the application. If a globally-addressable WLAN (e.g., an infrastructure network in IEEE 802.11) is available, then the priority of the WLAN interface may be set to high, and the WLAN interface may be selected for the application due to the high priority of the WLAN interface. If a globally-addressable WLAN is not available, then the priority of the WLAN interface may be lowered, and a WWAN interface may be selected for the application due to the lower priority of the WLAN interface.

Various aspects and features of the disclosure are described in further detail below.

DETAILED DESCRIPTION

Figure 1:
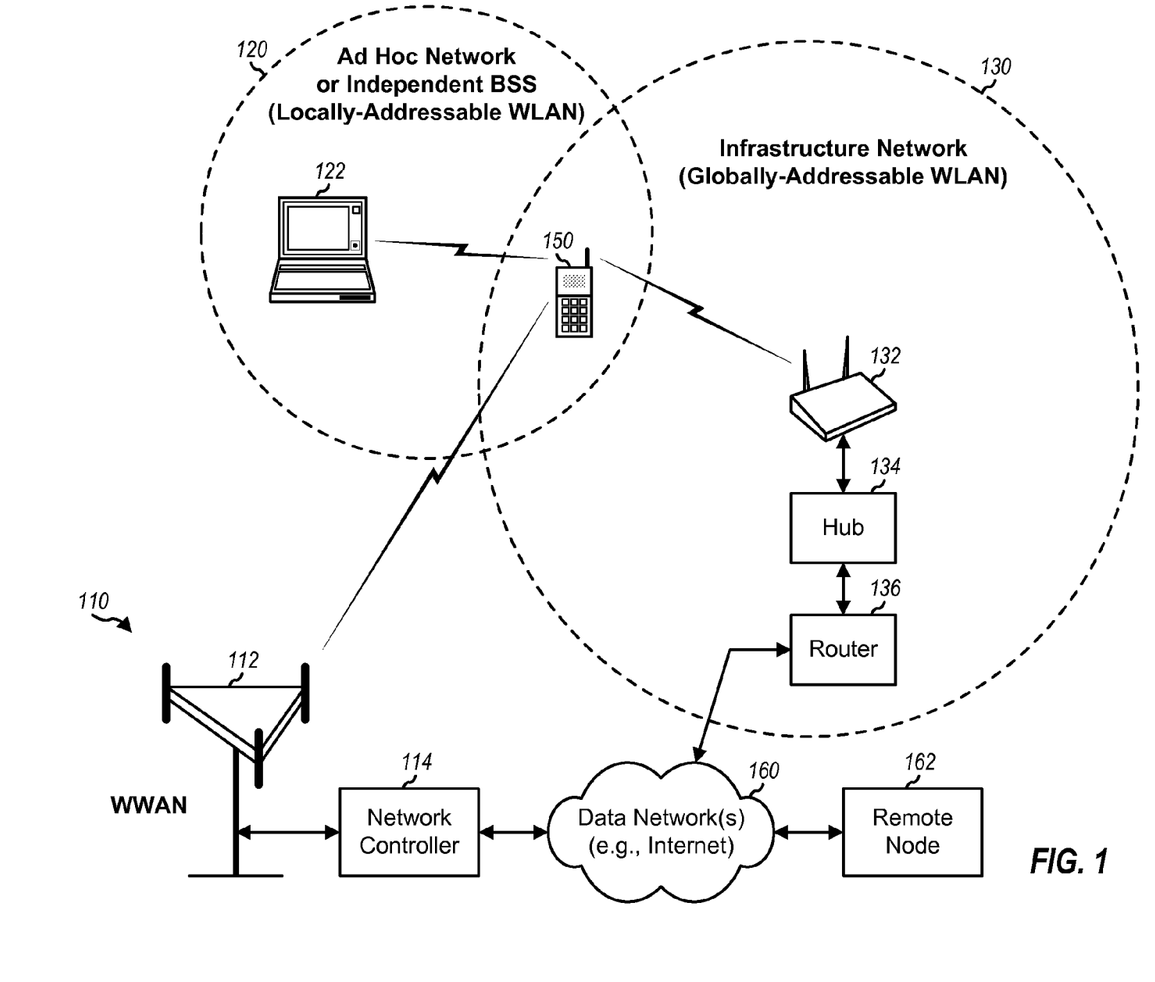
FIG. 1 shows a WWAN and two WLANs.

FIG. 1 shows a deployment area with a WWAN 110 and two WLANs 120 and 130. A WWAN is a wireless network that provides communication coverage for a large geographic area such as, e.g., a city, a state, or an entire country. A WWAN may be (1) a Code Division Multiple Access (CDMA) network that implements IS-95, IS-2000, IS-856 and/or other cdma2000 standards, (2) a Universal Mobile Telecommunication System (UMTS) network that implements Wideband-CDMA (W-CDMA) and/or other standards from an organization named "3rd Generation Partnership Project" (3GPP), (3) a Global System for Mobile Communications (GSM) network, or (4) some other cellular network. In general, WWAN 110 may support any radio interface such as CDMA, UMTS, GSM, etc. WWAN 110 typically includes many base stations that support communication for terminals within the coverage area of the WWAN. A base station may also be referred to as a Node B, an enhanced Node B, etc. For simplicity, only one base station 112 is shown in FIG. 1. A network controller 114 may be coupled to the base stations and provide coordination and control for these base stations. Network controller 114 may be a single network entity or a collection of network entities. Network controller 114 may also couple to private and/or public data networks 160, e.g., the Internet.

A WLAN is a wireless network that provides communication coverage for a medium geographic area such as, e.g., a building, a mall, a coffee shop, a school campus, an airport terminal, etc. A WLAN may implement IEEE 802.11, Hiperlan, etc. IEEE 802.11 is a family of standards for WLAN interface and is commonly used in the United States, Japan, and many other countries. Hiperlan is a WLAN interface that is commonly used in Europe. For clarity, certain aspects of the techniques are described below for WLANs that implement IEEE 802.11.

WLANs 120 and 130 are two types of wireless networks that may be formed in IEEE 802.11. In 802.11, a basic service set (BSS) is a set of stations controlled by a single coordination function, which may be performed by any of the stations in the BSS. A station is a device that contains an IEEE 802.11 conformant Medium Access Control (MAC) and physical layer (PHY) interface to a wireless medium. WLAN 120 is an independent BSS (IBSS), which is also commonly referred to as an ad hoc network. An ad hoc network is a BSS that forms a self-contained network and has no access to a distribution system. An ad hoc network is composed solely of stations within mutual communication range of each other via a wireless medium. A station in an ad hoc network may communicate peer-to-peer with another station in the ad hoc network but is not able to communicate with a node external to the ad hoc network via another station within the ad hoc network. In FIG. 1, ad hoc network 120 includes a WLAN station 122 and a terminal 150, which may communicate peer-to-peer with each another.

Ad hoc network 120 may be created in a spontaneous manner by any station without any pre-planning and for as long as the network is needed for communication. The station creating the ad hoc network determines a service set identifier (SSID), a basic service set identifier (BSSID), and other parameters pertinent for operation of the ad hoc network. An SSID is an alphanumeric string used to identify a WLAN (e.g., an ad hoc network) and may be up to 32 bytes long. A BSSID is a 48-bit MAC address that identifies a BSS and may be generated randomly when creating a BSS. Stations in the ad hoc network randomly take turn sending beacons, which carry the SSID, BSSID, and other information used to support operation of the ad hoc network.

WLAN 130 is an infrastructure BSS, which is also commonly referred to as an infrastructure network. An infrastructure network includes one or more access points and has capability to communicate with nodes external to the network. An access point is a station that provides access to distribution services via a wireless medium for other stations associated with the access point. In FIG. 1, WLAN 130 includes an access point 132 that couples to a local area network (LAN) via an Ethernet hub or switch 134. Ethernet hub 134 may also couple to a router 136, which may exchange data packets with data networks 160. Access point 132, Ethernet hub 134, and router 136 may also be combined in a single wireless router. Access point 132 is connected to a backhaul via hub 134 and router 136 and can support data exchanges between stations within infrastructure network 130 and hosts (e.g., a remote host 162) external to infrastructure network 130.

Terminal 150 may be able to communicate with one or more wireless networks. For example, terminal 150 may be able to communicate with WWAN 110, ad hoc network 120, and infrastructure network 130. Terminal 150 may thus be a WWAN device as well as a WLAN station. Terminal 150 may also be referred to as a mobile station, an access terminal, a user terminal, a user equipment, a mobile equipment, a station, a subscriber unit, etc. Terminal 150 may be a cellular phone, a laptop computer, a wireless device, a personal digital assistant (PDA), a wireless modem, a handset, etc.

Figure 2:
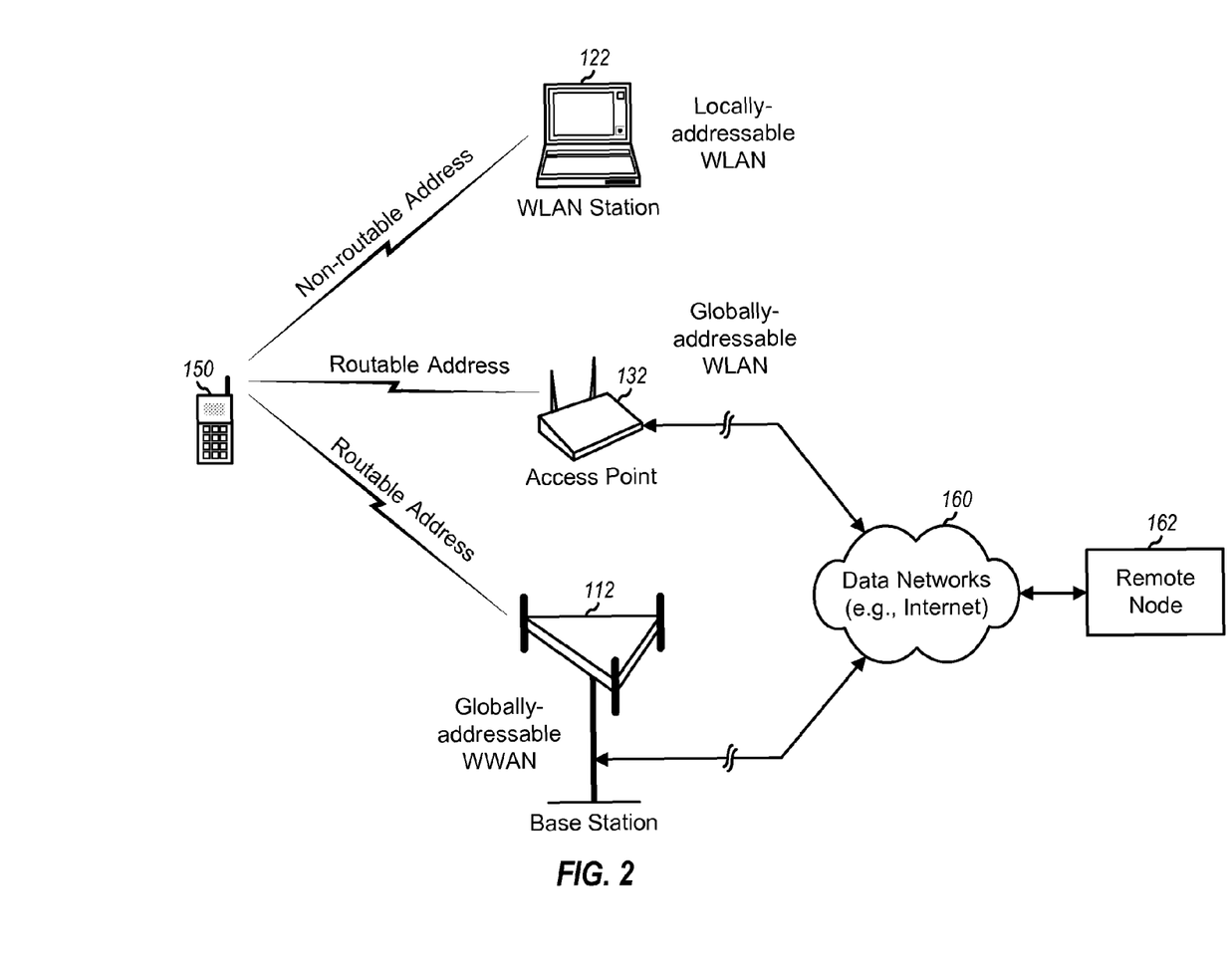
FIG. 2 shows communication between a terminal and the WWAN and WLANs.

FIG. 2 shows communication between terminal 150 and entities in WWAN 110 and WLANs 120 and 130. Terminal 150 may exchange data with WLAN station 122 in ad hoc network 120 using a link-local Internet Protocol (IP) address. A link-local address is an address that is valid for a single link within a given network and thus has limited scope. A link-local address may also be referred to as a non-routable address. Terminal 150 may dynamically generate a link-local IP address for itself by first randomly selecting an IP address within the range of 169.254.1.0 to 169.254.254.255. Terminal 150 may then send an Address Resolution Protocol (ARP) probe to determine whether the selected IP address is already in use by another station within ad hoc network 120. If this IP address is not already in use, then terminal 150 may send an ARP announcement to announce the selection of the IP address. Terminal 150 may thereafter exchange data with other stations in ad hoc network 120 using the selected IP address as a link-local IP address for terminal 150. ARP messages are described in various RFC documents that are publicly available.

Terminal 150 may exchange data with access point 132 in infrastructure network 130 using a global IP address. A global address is an address that is relevant beyond the immediate link and may also be referred to as a routable address. A global address may be a global IP address, a private IP address, etc. Terminal 150 may be preconfigured with a global IP address or may obtain one via a Dynamic Host Configuration Protocol (DHCP) server or some other mechanism. Terminal 150 may also exchange data with other stations in infrastructure network 130 using the global IP address. Terminal 150 may further exchange data with other nodes (e.g., remote node 162) outside of infrastructure network 130 using the global IP address.

Terminal 150 may exchange data with entities in WWAN 110, via base station 112, using a global IP address, e.g., the same global IP address used to exchange data with stations in infrastructure network 130. Terminal 150 may obtain a global IP address via WWAN-specific mechanism, e.g., via Point-to-Point Protocol (PPP) in cdma2000. Different air interfaces (e.g., WWAN, WLAN infra, etc.) may have different IP addresses. Terminal 150 may also exchange data with other nodes (e.g., remote node 162) via WWAN 110 using the global IP address.

In general, unique IP addresses are used at local and global levels to ensure that IP packets are sent to the proper destination nodes. A link-local IP address may be used for packets exchanged with other stations ad hoc network 120 since no packets are forwarded outside of the ad hoc network. A global IP address may be used for packets exchanged via WWAN 110 and infrastructure network 130 since these packets may be forwarded to nodes outside of these networks.

Terminal 150 may be in communication with WWAN 110, ad hoc network 120, and/or infrastructure network 130 at any given moment. It is desirable to use the most preferred wireless network among all wireless networks available to terminal 150 and capable of supporting the desired communication or data connectivity. WLAN may be deemed more economical and may thus be preferred whenever any WLAN is available. However, using WLAN for all applications whenever any WLAN is available may result in bad user experience in some scenarios. For example, terminal 150 may be connected to ad hoc network 120, and WLAN may be the preferred radio interface. An application (e.g., a Web browser) may then bind to the WLAN interface and may send data to remote node 162 via ad hoc network 120. This data transmission would fail since no data can be sent outside of ad hoc network 120. The user may be annoyed when informed of the failure.

Terminal 150 may identify locally-addressable and globally-addressable wireless networks. A wireless network may be locally-addressable due to lack of a backhaul connection to other networks (e.g., the Internet), due to the use of link-local IP addresses, etc. An example of a locally-addressable wireless network is ad hoc network 120. A wireless network may be globally-addressable if data can be sent outside of the wireless network with global IP addresses. Some examples of globally-addressable wireless networks are WWAN 120 and infrastructure network 130.

The terminal may prioritize radio interfaces for an application based on the locally-addressable and globally-addressable wireless networks, information obtained for the application, the application type, etc. The application type may indicate or may be associated with certain radio interface preferences, data requirements, etc. Terminal 150 may then select a suitable radio interface for the application based on the prioritized radio interfaces.

Some applications may exchange data with only stations in locally-addressable wireless networks (e.g., ad hoc network 120) and do not need connection to external networks. Some examples of such applications include applications for peer-to-peer communication, gaming, walkie-talkie, content sharing, content synchronization, etc. Locally-addressable wireless networks may be used for these applications. Some other applications may exchange data with remote nodes, e.g., nodes connected to the Internet. Some examples of such applications include applications for Web browser, email, Voice-over-IP (VoIP), multimedia, data connectivity, etc. Globally-addressable wireless networks may be used for these applications.

In one design, terminal 150 sets the priority of WLAN interface to high when connected to a globally-addressable WLAN (e.g., infrastructure network 130) and lowers the priority of the WLAN interface when connected to a locally-addressable WLAN (e.g., ad hoc network 120). When the WLAN interface priority is set high, applications may bind to the WLAN interface and may be connected to the globally-addressable WLAN, unless there are reasons to use other radio interfaces. When the WLAN interface priority is lowered, applications that can operate in a locally-addressable WLAN may provide this information, and these applications may then be connected to the locally-addressable WLAN. For other applications that may exchange data with remote nodes connected to the Internet, another radio interface (e.g., CDMA, UMTS, or GSM) may be selected for these applications if such radio interface is available.

A radio interface may be selected for an application when the application is first launched. The application may not be aware of which radio interfaces are supported by terminal 150 and which wireless networks are available. The application may simply request connection to a wireless network. By lowering the WLAN interface priority when terminal 150 is connected to a locally-addressable WLAN (e.g., ad hoc network 120), another radio interface (e.g., CDMA, UMTS, GSM, etc.) for a globally-addressable wireless network may be selected for the application. This may then avoid a scenario in which the application binds to a locally-addressable WLAN, attempts to send packets outside of the locally-addressable WLAN, and encounters data failure.

The design above assumes that applications that can operate in a locally-addressable WLAN would provide this information when these applications are launched. These applications may then be connected to a locally-addressable WLAN when the WLAN interface priority is lowered. The information indicating that an application can operate in a locally-addressable WLAN may be given in various forms. For example, the information may be in the form of an explicit command to use any WLAN if available, to use a locally-addressable WLAN if available, etc. The information may also indicate that is it is acceptable to use a link-local IP address for the application.

In another design, applications that cannot operate in a locally-addressable WLAN may provide this information when these applications are launched. These applications may then be connected to a globally-addressable wireless network using another radio interface when the WLAN interface priority is lowered. In yet another design, each application is associated with information (e.g., a bit) indicating whether or not the application can operate in a locally-addressable WLAN. In general, applications that can operate in a locally-addressable WLAN and applications that cannot operate in a locally-addressable WLAN may be distinguished in various manners, e.g., based on information provided by the applications, information associated with the applications, etc.

Terminal 150 may determine that it is connected to an ad hoc network in various manners. Terminal 150 may create an ad hoc network and would then know that it is connected to an ad hoc network. Terminal 150 may also join an ad hoc network and may receive beacons transmitted by other stations in the ad hoc network. A beacon contains a Capability Information field that includes an IBSS subfield. The IBSS subfield is set to '1' by a station sending a beacon in an IBSS. Terminal 150 may thus be able to determine whether it is connected to an ad hoc network based on the content of the IBSS subfield in a received beacon. Terminal 150 may also identify locally-addressable wireless networks in other manners for other radio interfaces.

Figure 3:
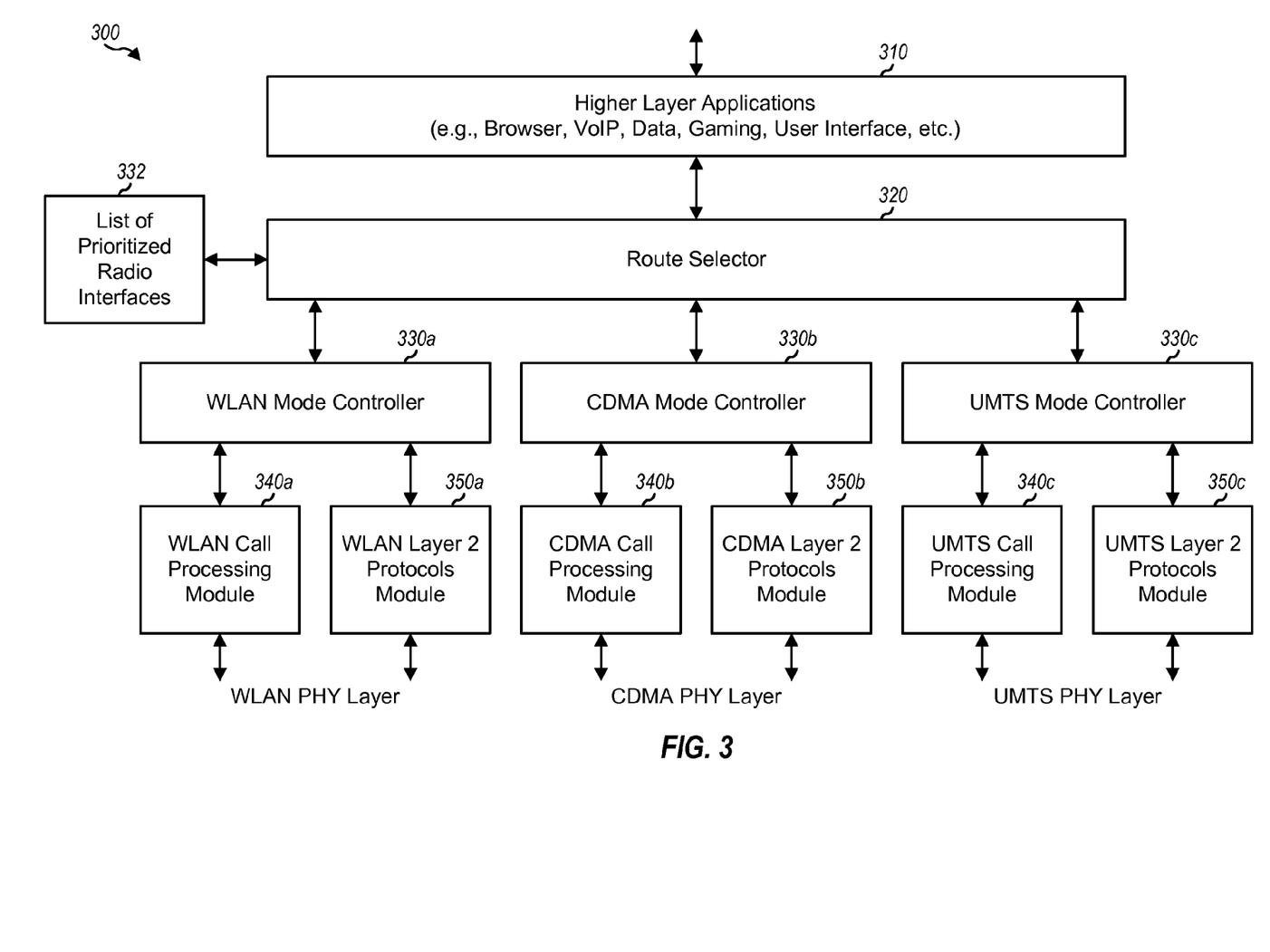
FIG. 3 shows a processing module for the terminal.

FIG. 3 shows a design of a processing module 300 for terminal 150. FIG. 3 is used to provide a description of module interaction and call flow but may not depict the actual layering of a protocol stack. Within processing module 300, higher layer applications 310 include various end-user applications such as, e.g., browser applications, VoIP applications that provide voice services, data applications that provide data services, gaming applications, user interface (UI) applications, an email client, etc. These applications may generate requests to connect to wireless networks.

A route selector 320 receives connection requests from the applications, determines a list of prioritized radio interfaces for each requesting application, and maps each application to a suitable radio interface based on the prioritized list for that application. The prioritized list for each application may be determined based on radio interfaces supported by terminal 150, wireless networks available to terminal 150, the requirements and/or preferences of the application, etc. The list of prioritized radio interfaces for each application may be stored in a memory 332.

In the design shown in FIG. 3, terminal 150 supports three radio interfaces—WLAN (e.g., IEEE 802.11), CDMA (e.g., IS-95, IS-2000, IS-858, and/or other cdma2000 standards), and UMTS (e.g., W-CDMA and/or other 3GPP standards). In general, terminal 150 may support any number of radio interfaces and any type of radio interface. The WLAN interface is supported by a WLAN mode controller 330a, a WLAN call processing module 340a, and a WLAN Layer 2 protocols module 350a. The CDMA interface is supported by a CDMA mode controller 330b, a CDMA call processing module 340b, and a CDMA Layer 2 protocols module 350b. The UMTS interface is supported by a UMTS mode controller 330c, a UMTS call processing module 340c, and a UMTS Layer 2 protocols module 350c.

Mode controller 330 for each radio interface may perform various functions such as configuration and maintenance of a protocol stack for the associated radio interface, maintenance of an access control list, IP address configuration, interaction with Layer 2 protocols for the associated radio interface, etc. A protocol stack may include various protocols in various layers such as Transmission Control Protocol (TCP) and User Datagram Protocol (UDP) at a transport layer, IP at a network layer, and network-specific protocols (e.g., PPP) at a link layer. An access control list for each radio interface may include wireless networks that are accessible by terminal 150 for that radio interface. IP address configuration may entail requesting for global IP addresses using network-specific mechanisms such as DHCP for WLAN, PPP for CDMA, etc. IP address configuration may also entail generating link-local IP addresses for ad hoc networks in WLAN.

Call processing module 340 for each radio interface may perform processing to exchange signaling with a wireless network of the associated radio interface. The signaling exchanges may be dependent on the radio interface and may be used to establish and maintain a connection with the wireless network. Call processing module 340a for WLAN may create an ad hoc network, connect to or associated with an ad hoc network or an infrastructure network, perform authentication, etc.

Layer 2 protocols module 350 for each radio interface may perform processing for protocols at Layer 2 for the associated radio interface. Layer 2 protocols may include MAC, PPP (for CDMA), etc. Modules 340 and/or 350 for each radio interface may communicate with a module (not shown in FIG. 3) that performs processing for the physical layer for that radio interface.

Route selector 320 may determine a list of prioritized radio interfaces for an application based on the radio interfaces supported by terminal 150, the wireless networks available to terminal 150, data requirements and/or preferences of the application, etc. The application may provide its preference (e.g., for WLAN), its data requirements (e.g., for globally-addressable network), etc. WLAN, CDMA and UMTS may be given different priorities for different applications. For example, the prioritized list for a gaming application may include WLAN, CDMA and UMTS, where WLAN is the most preferred (e.g., regardless of whether a locally-addressable WLAN or a globally-addressable WLAN is available) and UMTS is the least preferred. As another example, the prioritized list for a browser application may include CDMA, UMTS, and WLAN, where CDMA is the most preferred and WLAN is the least preferred if a locally-addressable WLAN is available. The prioritized list for the browser application may include WLAN, CDMA, and UMTS, where WLAN is the most preferred if a globally-addressable WLAN is available. For some applications (e.g., the browser application), WLAN may have different priorities depending on whether a locally-addressable WLAN or a globally-addressable WLAN is available.

Route selector 320 may form a prioritized list for an application and may provide the highest priority radio interface in the list. A connection may then be established with a wireless network for the highest priority radio interface. If connection establishment fails with this wireless network, then the next highest priority radio interface in the list may be provided, and connection may be established with a wireless network for this radio interface.

Figure 4:
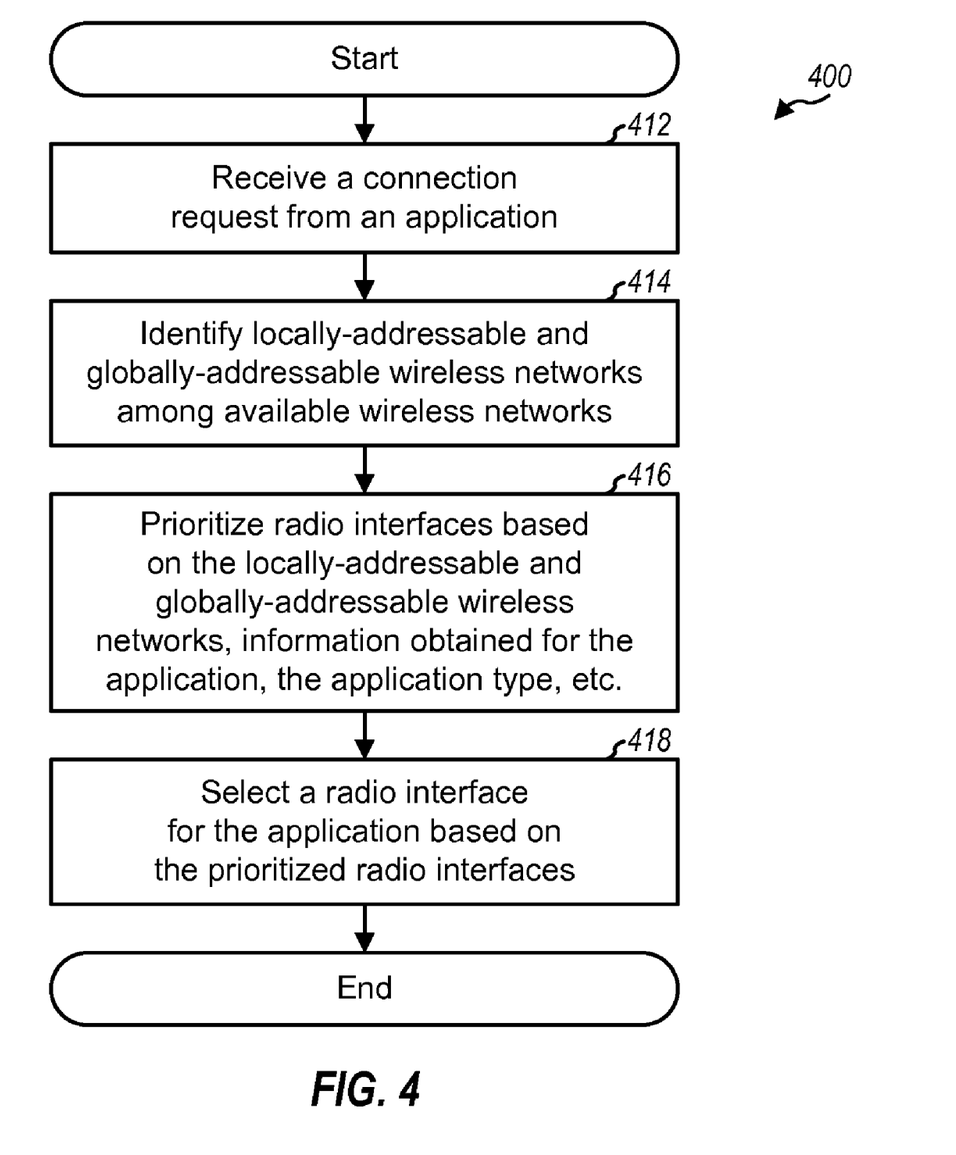
FIG. 4 shows a process for selecting radio interface for an application.

FIG. 4 shows a process 400 for selecting radio interface for an application. A connection request is received from the application (block 412). Locally-addressable and globally-addressable wireless networks are identified among available wireless networks (block 414). Locally-addressable and globally-addressable WLANs may be identified based on beacons received from stations or access points in these WLANs. Radio interfaces are prioritized based on the locally-addressable and globally-addressable wireless networks, information obtained for the application, the application type, etc. (block 416). The application type may be associated with certain radio interface preferences or requirements. A radio interface is selected for the application based on the prioritized radio interfaces (block 418).

In one design, if a locally-addressable WLAN (e.g., an ad hoc network in IEEE 802.11) is available, then WLAN interface may be selected for the application based on information indicating that the WLAN interface is preferred and any WLAN (e.g., even locally-addressable WLAN) is acceptable for the application. If a globally-addressable WLAN (e.g., an infrastructure network in IEEE 802.11) is available, then the priority of the WLAN interface may be set to high, and the WLAN interface may be selected for the application due to the high priority of the WLAN interface (e.g., even in the absence of information indicating preference for WLAN). If a globally-addressable WLAN is not available, then the priority of the WLAN interface may be lowered, and a WWAN interface (e.g., CDMA, UMTS, GSM, etc.) may be selected for the application due to the lower priority of the WLAN interface.

Figure 5:
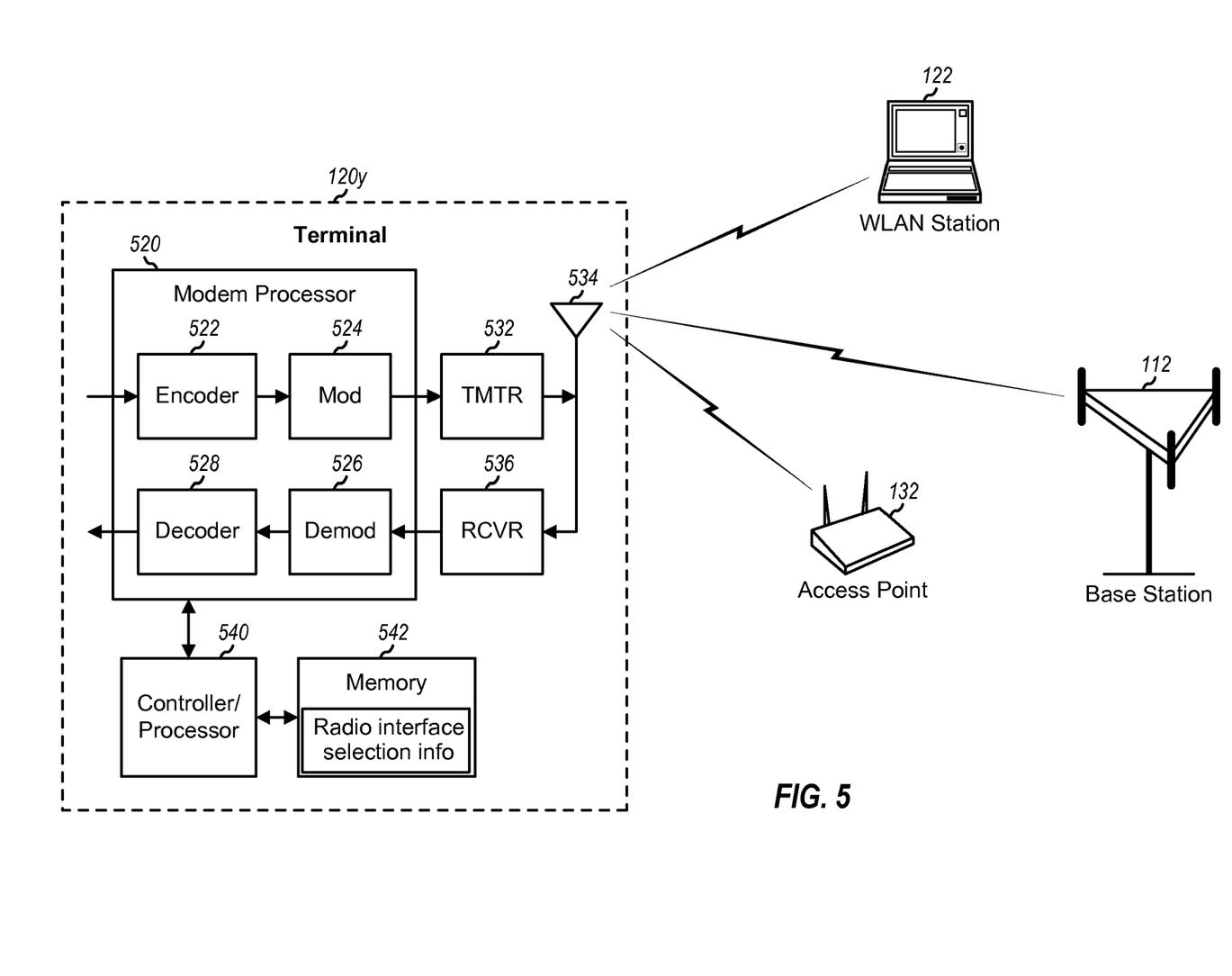
FIG. 5 shows a block diagram of the terminal.

FIG. 5 shows a block diagram of a design of terminal 150. On the transmit path, an encoder 522 receives data and signaling to be sent by terminal 150 to a base station in a WWAN, an access point or a station in a WLAN, etc. Encoder 522 processes (e.g., formats, encodes, and interleaves) the data and signaling in accordance with a suitable coding scheme. A modulator (Mod) 524 further processes (e.g., modulates and scrambles) the coded data and signaling and generates output chips. In general, the processing by encoder 522 and modulator 524 is determined by the radio interface via which the data and signaling are sent, e.g., WLAN, CDMA, UMTS, etc. A transmitter (TMTR) 532 conditions (e.g., converts to analog, filters, amplifies, and frequency upconverts) the output chips and generates an RF output signal, which is transmitted via an antenna 534.

On the receive path, antenna 534 receives RF signals transmitted by base stations in a WWAN, access points and/or stations in WLANs, etc. A receiver (RCVR) 536 conditions (e.g., filters, amplifies, frequency downconverts, and digitizes) the received RF signal from antenna 534 and provides samples. A demodulator (Demod) 526 processes (e.g., descrambles and demodulates) the samples and provides symbol estimates. A decoder 528 processes (e.g., deinterleaves and decodes) the symbol estimates and provides decoded data and signaling. In general, the processing by demodulator 526 and decoder 528 is complementary to the processing performed by the modulator and encoder at the transmitting base stations, access points, and/or stations. Encoder 522, modulator 524, demodulator 526 and decoder 528 may be implemented by a modem processor 520.

A controller/processor 540 directs the operation of various processing units at terminal 150. Controller/processor 540 and/or other processing units within terminal 150 may implement processing module 300 in FIG. 3. Controller/processor 540 may also implement or direct process 400 in FIG. 4 and/or other processes to support radio interface selection for applications. A memory 542 stores program codes and data for terminal 150. Memory 542 may also store radio interface selection information for applications. For simplicity, FIG. 5 shows one instance of each processing unit. In general, there may one or multiple modem processors, transmitters, receivers, controllers, and memories for different radio interfaces supported by terminal 150.

The techniques described herein may be implemented by various means. For example, these techniques may be implemented in hardware, firmware, software, or a combination thereof. For a hardware implementation, the processing units used to perform radio interface selection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 542 in FIG. 5) and executed by a processor (e.g., processor 540). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
   a processor configured to:
   receive a connection request from an application;
   identify a locally-addressable wireless ad hoc network and a globally-addressable wireless infrastructure network among available wireless networks, wherein the locally-addressable wireless ad hoc network has no access to external networks and the globally-addressable wireless infrastructure network has access to external networks;
   prioritize radio interfaces based on a type of the application and an availability of the locally-addressable and globally-addressable wireless networks;
   select a radio interface for the application based on the prioritized radio interfaces; and
   a memory coupled to the processor.

2. The apparatus of claim 1, wherein the available wireless networks include a locally-addressable wireless local area network (WLAN).

3. The apparatus of claim 2, wherein the processor is configured to obtain information indicative of preference for WLAN interface by the application and to select the WLAN interface for the application.

4. The apparatus of claim 2, wherein the processor is configured to receive a beacon from a station in the locally-addressable WLAN and to identify the locally-addressable WLAN based on the received beacon.

5. The apparatus of claim 2, wherein the locally-addressable WLAN is an ad hoc network in IEEE 802.11.

6. The apparatus of claim 1, wherein the available wireless networks include a globally-addressable wireless local area network (WLAN).

7. The apparatus of claim 6, wherein the processor is configured to set priority of WLAN interface to high when the globally-addressable WLAN is available, and to select the WLAN interface for the application due to the high priority of the WLAN interface.

8. The apparatus of claim 6, wherein the globally-addressable WLAN is an infrastructure network in IEEE 802.11.

9. The apparatus of claim 1, wherein the processor is configured to lower priority of wireless local area network (WLAN) interface when a globally-addressable wireless WLAN is not available, and to select a wireless wide area network (WWAN) interface for the application.

10. The apparatus of claim 9, wherein the WWAN interface is Code Division Multiple Access (CDMA), Universal Mobile Telecommunication System (UMTS), or Global System for Mobile Communications (GSM).

11. The apparatus of claim 1, wherein the processor is configured to select the radio interface for the application in response to the connection request.

12. The apparatus of claim 1, wherein the type of the application is associated with data requirements of the application.

13. A method comprising:
   receiving a connection request from an application;
   identifying a locally-addressable wireless ad hoc network and a globally-addressable wireless infrastructure network among available wireless networks, wherein the locally-addressable wireless ad hoc network has no access to external networks and the globally-addressable wireless infrastructure network has access to external networks;
   prioritizing radio interfaces based on a type of the application and an availability of the locally-addressable and globally-addressable wireless networks; and
   selecting a radio interface for the application based on the prioritized radio interfaces.

14. The method of claim 13, wherein the selecting a radio interface for the application comprises obtaining information indicative of preference for wireless local area network (WLAN) interface by the application, and selecting the WLAN interface for the application.

15. The method of claim 13, wherein the prioritizing the radio interfaces comprises setting priority of wireless local area network (WLAN) interface to high when a globally-addressable WLAN is available, and wherein the selecting a radio interface for the application comprises selecting the WLAN interface for the application due to the high priority of the WLAN interface.

16. The method of claim 13, wherein the prioritizing the radio interfaces comprises lowering priority of wireless local area network (WLAN) interface when a globally-addressable wireless WLAN is not available, and wherein the selecting a radio interface for the application comprises selecting a wireless wide area network (WWAN) interface for the application.

17. The method of claim 13, wherein the type of the application is associated with data requirements of the application.

18. An apparatus comprising:
   means for receiving a connection request from an application;
   means for identifying a locally-addressable wireless ad hoc network and a globally-addressable wireless infrastructure network among available wireless networks, wherein the locally-addressable wireless ad hoc network has no access to external networks and the globally-addressable wireless infrastructure network has access to external networks;
   means for prioritizing radio interfaces based on a type of the application and an availability of the locally-addressable and globally-addressable wireless networks; and
   means for selecting a radio interface for the application based on the prioritized radio interfaces.

19. The apparatus of claim 18, wherein the means for selecting a radio interface for the application comprises means for obtaining information indicative of preference for wireless local area network (WLAN) interface by the application, and means for selecting the WLAN interface for the application.

20. The apparatus of claim 18, wherein the means for prioritizing the radio interfaces comprises means for setting priority of wireless local area network (WLAN) interface to high when a globally-addressable WLAN is available, and wherein the means for selecting a radio interface for the application comprises means for selecting the WLAN interface for the application due to the high priority of the WLAN interface.

21. The apparatus of claim 18, wherein the means for prioritizing the radio interfaces comprises means for lowering priority of wireless local area network (WLAN) interface when a globally-addressable wireless WLAN is not available, and wherein the means for selecting a radio interface for the application comprises means for selecting a wireless wide area network (WWAN) interface for the application.

22. A non-transitory processor-readable media for storing instructions to:
  receive a connection request from an application;
  identify a locally-addressable wireless ad hoc network and a globally-addressable wireless infrastructure network among available wireless networks, wherein the locally-addressable wireless ad hoc network has no access to external networks and the globally-addressable wireless infrastructure network has access to external networks;
  prioritize radio interfaces based on a type of the application and an availability of the locally-addressable and globally-addressable wireless networks; and
  select a radio interface for the application based on the prioritized radio interfaces.

23. The processor-readable media of claim 22, and further for storing instructions to: obtain information indicative of preference for wireless local area network (WLAN) interface by the application, and select the WLAN interface for the application.

24. The processor-readable media of claim 22, and further for storing instructions to: set priority of wireless local area network (WLAN) interface to high when a globally-addressable WLAN is available, and select the WLAN interface for the application due to the high priority of the WLAN interface.

25. The processor-readable media of claim 22, and further for storing instructions to: lower priority of wireless local area network (WLAN) interface when a globally-addressable wireless WLAN is not available, ands elect a wireless wide area network (WWAN) interface for the application.

* * * * *